July 23, 1946.   W. PROTT   2,404,744
ANIMAL TRAP
Filed March 22, 1945
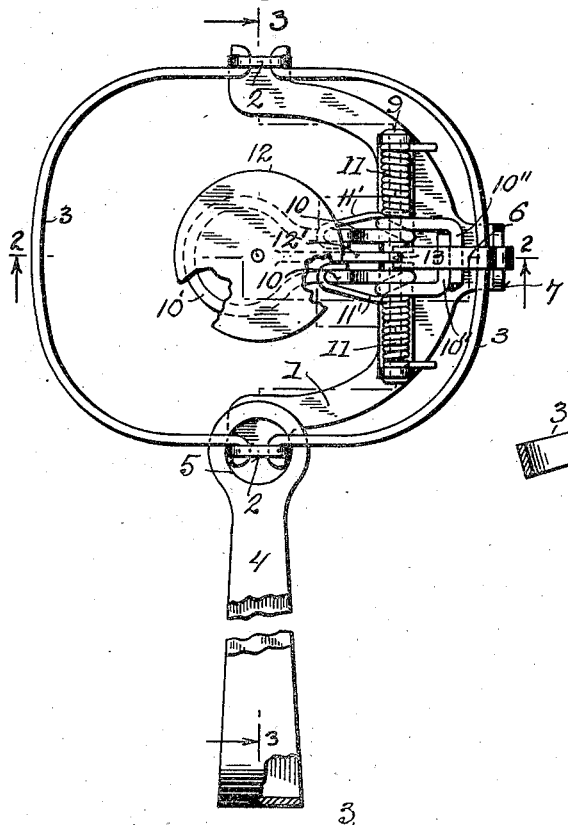
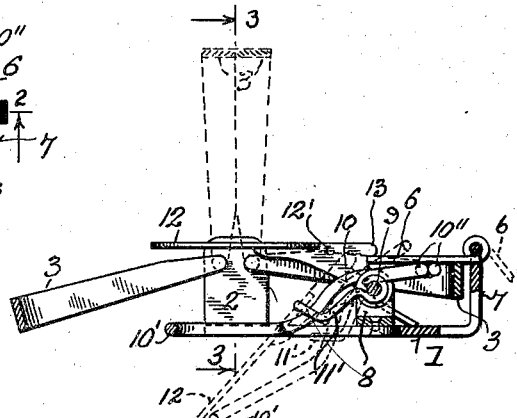
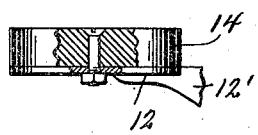
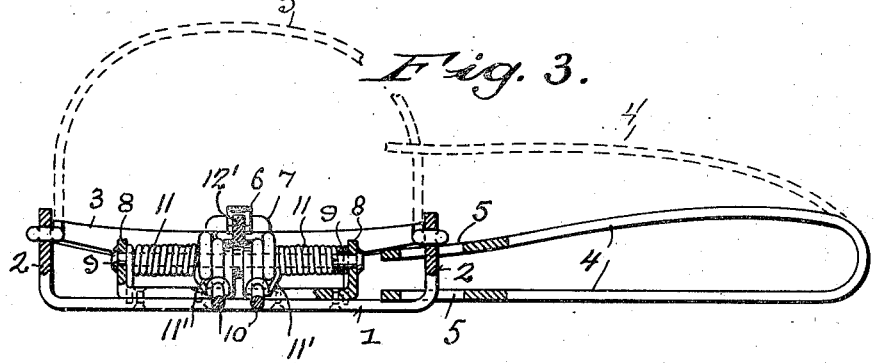
INVENTOR
WILLIAM PROTT
ATTORNEYS Patented July 23, 1946

2,404,744

UNITED STATES PATENT OFFICE 2,404,744

ANIMAL TRAP

William Prott, Poynette, Wis.

Application March 22, 1945, Serial No. 584,142

1 Claim. (Cl. 43—88)

My invention refers to traps of the jaw type, and it has for its object a simple positive spring controlled ground gripping yoke nested under the pad, which yoke upon release of the trap jaws, in advance of a closing movement causes the trap as a unit to spring upwardly, whereby the jaws will close upon the animal's leg, at a higher point than would occur under standard trap conditions. Thus, the danger of biting the foot of the animal is avoided whereby the same may escape.

Another object of my invention is to provide a jaw lock and release trigger associated with the trap pad, adapted to hold the yoke under independent spring tension and also the jaws, whereby both the spring controlling the jaws and the spring controlling the lifting yoke are released by pressure of the animal upon the trap pad.

A further object of my invention is to provide a horseshoe base about the trap pad, whereby the animal may freely enter the trap, the toe of the base being provided with a pivot rod, upon which is pivotally mounted a ground gripping yoke having companion feet, engageable with a trigger, and by coil springs encircling the pivot rod with ends engaging the yoke arm, whereby the ground gripping yoke is loaded and released.

With the above and other minor objects in view, the invention consists in certain peculiarities of construction and combination of parts as will be hereinafter fully set forth with reference to the drawing and subsequently claimed:

In the drawing:

Figure 1 represents a plan view of a jawed animal trap, equipped with a spring controlled ground gripping yoke, embodying the features of my invention.

Figure 2, a sectional elevation of the same, the section being indicated by line 2—2 of Figure 1.

Figure 3, a front elevation of a trap partly in section, as indicated by line 3—3 of Figure 1, and Figure 4, a detailed partly sectional view of a block, which may, under certain conditions, be attached to the trap pad for raising its elevation.

Referring by characters to the drawing, 1 indicates a horseshoe frame or base, having apertured ears 2, extending upwardly therefrom. The ears have pivoted therein standard animal gripping jaws 3—3 which jaws are closed by a bowed spring 4, terminating with end openings 5. The end openings engage one of the ears 2, and when the jaws are closed, as indicated in dotted lines, Figure 3, the bowed tension load will cause both jaws to close incidental to upward movement of the bow spring, whereby the opening 5 in one of the bowed ends of the spring will ride upwardly, and in its engagement with surfaces of the jaws, cause the same to snap closed. It is understood that this mechanism with the exception of the horseshoe base is of standard construction.

When the trap is set as indicated in Figure 1 of the drawing, the jaws are locked in their open position by a trigger 6, which trigger is pivotally mounted upon an ear 7, extending upwardly from the base 1.

As clearly indicated in Figures 1 and 2 of the drawing, the toe of the base 1 has secured thereto a pair of eared brackets 8, which have mounted therein a pivot rod 9.

The rod 9 has pivotally mounted thereon legs 10, a bowed ground gripping yoke 10', and the rear ends of the legs terminate with transversely disposed feet 10'', which feet are directly under the trigger 6.

A pair of loading springs 11, for the yoke, are coiled about the pivot rod 9 with their inner ends 11' engaging the legs 10 of the yoke.

Directly aligned over the yoke is the standard tripping pad 12. The pad has rearwardly extended therefrom, a finger 12', which finger is pivotally mounted upon the pivot rod 9 between the legs of the yoke. The finger 12' is also formed with a locking tooth 13, offset from and aligned with the pivot rod and said finger, as best shown in Figures 1 and 2, engages the end of the trigger 6, when the trap is set.

From the foregoing, it is apparent that the springs controlling the yoke and spring controlled trap jaws are both under tension and locked in their loaded position by the trigger 6, which engages one of the jaws 3, and also the feet 10'' of the yoke, due to the locked position between the pad 12 and the trigger.

In practice, the trap, when set, is covered by a layer of soil, and in some instances, where it is desired to imbed the trap deeper, I may employ an auxiliary pad piece 14 as indicated in Figure 4, and may be attached to the pad 12 by a bolt or other means.

From the foregoing description, it is apparent that when the trap is set and suitably concealed, in the event an animal steps upon the pad 12, the trigger 6 will be immediately released, and the spring tension associated with the yoke 10' will immediately cause the trap to spring upwardly and the jaws 3, as they close, will securely grip or bite the leg of the animal at a high and safe elevation above the foot of said animal, whereby accidental release of the animal is avoided.

While I have shown and described my invention minutely as to detail, it is understood that I may vary the structural features within the scope of the claim.

I claim:

In an animal trap having a skeleton base, jaws pivotally mounted thereon, a spring carried by the base for engaging and swinging the jaws, a centrally positioned pad, a pivoted locking trigger for the jaws carried by the base for engaging the pad; the combination of a lifting means for the trap, comprising a pivot rod carried by the base, a ground gripping yoke having legs pivoted upon the rod, a foot extending rearwardly from the legs, and coil springs carried by the rod, having ends engaging the yoke legs, said pivoted trigger engaging one of the jaws, yoke foot and pad.

WILLIAM PROTT.